United States Patent

Downs

[15] 3,681,621

[45] Aug. 1, 1972

[54] ADJUSTABLE FREQUENCY BIPOLAR SQUARE WAVE GENERATING CIRCUIT

[72] Inventor: Robert F. Downs, Santa Ana, Calif.

[73] Assignee: The Okonite Company, Ramsey, N.J.

[22] Filed: Sept. 17, 1969

[21] Appl. No.: 858,636

[52] U.S. Cl. ..................307/271, 307/243, 307/246, 307/247, 328/65, 328/223

[51] Int. Cl. ..............................................H03k 1/16

[58] Field of Search......307/243, 246, 270, 271, 247; 328/27, 36, 65, 68, 140, 223, 261

[56] References Cited

UNITED STATES PATENTS

| | | | |
|---|---|---|---|
| 2,547,523 | 4/1951 | Eicher | 328/68 X |
| 2,554,308 | 5/1951 | Miller | 328/223 X |
| 2,848,738 | 7/1958 | Kerker | 328/223 X |
| 2,941,125 | 6/1960 | Lippincott | 328/65 X |
| 3,187,260 | 6/1965 | Dove | 307/246 X |
| 3,336,536 | 8/1967 | Dame | 307/271 X |
| 3,337,767 | 8/1967 | Munier de Montrichard et al. | 307/270 X |

*Primary Examiner*—Stanley T. Krawczewicz
*Attorney*—Walter J. Jagmin

[57] ABSTRACT

An inverter circuit for providing low-frequency pulses to a load device, such as the ringer winding of a telephone set, the circuit having a high-frequency oscillator, a capacitor charging-circuit energized by the output of the high-frequency oscillator for providing positive-going pulses across the output of the inverter circuit each time the high-frequency oscillator is rendered operative for a predetermined period of time, a pulse circuit for providing the load device with negative-going pulses each time it is operative; and a low-frequency oscillator for alternatively, at a low frequency, rendering the high-frequency oscillator and the pulse circuit operative for predetermined periods of time, whereby said output of the inverter circuit is energized by alternately positive and negative-going pulses.

9 Claims, 1 Drawing Figure

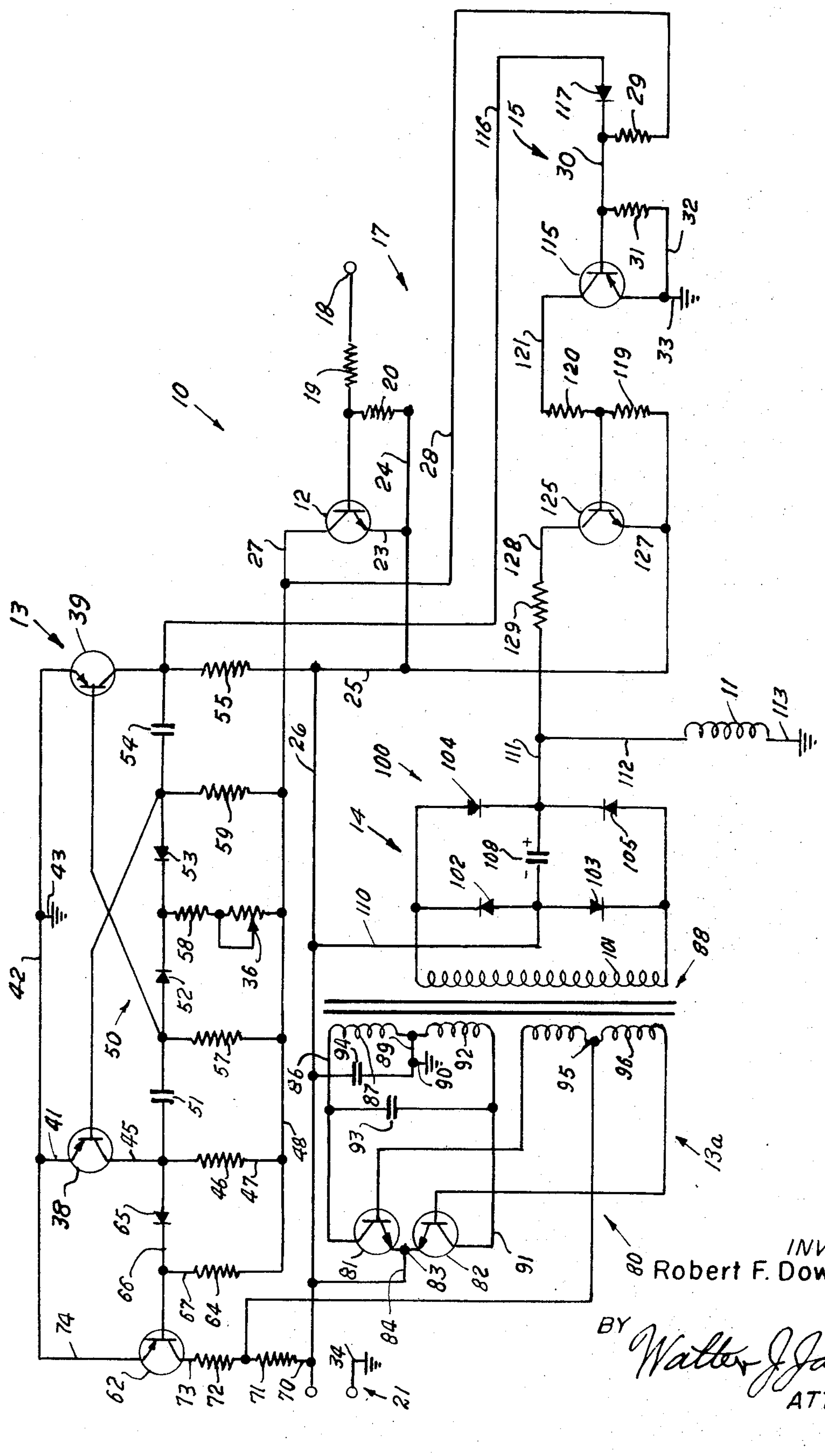
INVENTORS
Robert F. Downs
BY Walter J Jagmin
ATTORNEY

ADJUSTABLE FREQUENCY BIPOLAR SQUARE WAVE GENERATING CIRCUIT

This invention relates to control circuits and, more particularly, to a circuit for energizing a load device, such as the ringer of a telephone set, with low-frequency, high-amplitude pulses.

An object of this invention is to provide a new and improved circuit of small and compact size for providing low-frequency relatively high-amplitude pulses for energizing a load device, such as a ringer of a telephone set.

Another object is to provide a circuit of the type described having a high-frequency oscillator and a capacitor charging circuit for providing a positive-going pulse during each period of operation of the high-frequency oscillator, a pulse circuit for providing a negative-going pulse each time it is rendered operative, and a low-frequency oscillator for rendering said high-frequency oscillator and the pulse circuit alternately operative.

Still another object is to provide a circuit of the type described having control means for controlling operation of the low-frequency oscillator.

A further object is to provide a circuit for producing alternately positive and negative-going square wave pulses at a relatively low frequency, for example, between 16 Hz and 67 Hz, having a push-pull type, high-frequency oscillator, a low-frequency multivibrator for rendering the high-frequency oscillator operative for predetermined periods of time at predetermined intervals of low frequency, a capacitor charging network energized by the output of the high-frequency oscillator for producing a positive-going pulse during each period of operation of the high-frequency oscillator, and a pulse circuit for providing a negative-going pulse each time it is rendered operative, the multivibrator rendering the pulse circuit operative each time it renders the oscillator inoperative.

Additional objects and advantages of the invention will be readily apparent from the reading of the following description of a device constructed in accordance with the invention, and reference to the accompanying drawing thereof, wherein the single FIGURE is a schematic illustration of the circuit embodying the invention.

Referring now to the single FIGURE of the drawing, the circuit 10 for controlling the operation of a load device, such as the ringer winding 11 of a telephone set, by low-frequency pulses, for example 16 to 67 Hz, includes a control transistor 12 which, when its emitter-collector circuit is conductive, causes energization of a low-frequency multivibrator 13, for example 16 to 67 Hz, which in turn controls operation of a push-pull type, high-frequency oscillator **13*a*, e.g., 15 KHz. The output of the inverter 10 is converted by a rectifier network 14 into positive-going pulses which are applied across the winding 11**.

The control transistor 12 and the multivibrator 13 also cooperate to control operation of a pulse circuit 15 which provides negative-going pulses to the winding 11 alternately with the positive-going pulses provided by the rectifier network 14 so that winding 11 has applied thereacross alternately positive and negative-going square wave pulses of the same frequency as the output of the multivibrator.

The control signal for rendering the emitter-collector circuit of the control transistor 12 conductive is transmitted, from any desired control circuit or switch to a terminal 18 connected to the base of the transistor through a resistance 19. A resistance 20 has one side connected to the common connection of the resistance 19 and the base of the transistor 12, and its other side to the negative side of an input circuit of negative voltage 21 by the conductors 24, 25 and 26. The emitter-collector circuit of the transistor 12 is connected across the input circuit 21 through the conductors 27 and 28, a resistance 29, a conductor 30, a resistance 31, conductors 32 and 33, ground 34.

When the emitter-collector circuit of the control transistor 12 is rendered conductive, it causes the multivibrator 13 to operate and provide output signals which may vary over a predetermined range, for example 16 Hz to 67 Hz, as determined by the setting of the variable resistance 36 of the multivibrator.

The multivibrator 13 includes a pair of transistors 38 and 39, the emitter-collector circuit of the transistor 38 being connectible across the input circuit only through the emitter-collector circuit of the control transistor since the emitter of the transistor 38 is connected to the grounded side of the input circuit 21 through the conductors 41, 42 and 43, ground 34 while its collector is connectible to the other negative side of the input circuit 21 through the conductor 45, a resistance 46, conductors 47, 48 and 27, the emitter-collector circuit of the transistor 12, and the conductors 23, 24, 25 and 26. It will thus be seen that the transistor 38 can be conductive only when the control transistor 12 is conductive and therefore the multivibrator 13 will operate only when the control transistor 12 is conductive.

The multivibrator 13 may be of any suitable type and have a control network 50 for rendering the transistors 38 and 39 alternately conductive in the usual well-known manner. The control network 50 includes a capacitor 51, diodes 52 and 53, and a capacitor 54 connected in series between the common connection of the resistance 46 and the collector of the transistor 38 and the common connection of a resistance 55 and the collector of the transistor 39. A resistance 57 connects the common connection of the capacitor 51 and diode 52 to the conductor 48, a resistance 58 connected in series with the variable resistance 36 connects the common connection of diodes 52 and 53 to the conductor 48, and a resistance 59 connects the common connection of the diode 53 and capacitor 54 to the conductor 48.

The base of the transistor 38 is connected to the common connection of the diode 53, the resistance 59 and the capacitor 54, and similarly, the base of the transistor 39 is connected to the common connection of the capacitor 51, the diode 52 and the resistance 53.

The output of the multivibrator 13 is transmitted to the inverter control transistor 62 of an inverter 80. A potential is applied to the base of the transistor 62 when the control transistor 12 is conductive through a resistance 64 connected between the common connection of a diode 65 and the base of the transistor 62 and the collector of the control transistor 12 by the conductors 66, 67, 48 and 27. The emitter-collector circuit of the transistor 62 is connected to the negative voltage side of the power input circuit 21 by the conductors 26 and 70, the serially connected resistance 71 and 72 and the conductors 73, 74, 42, and 43, ground 34.

It will now be seen that the emitter-collector circuit of the inverter control transistor 62 can be rendered conductive if the control transistor 12 is conductive and if, at the same time, the transistor 38 of the multivibrator is not conductive since the base of the transistor 62 is connected by the diode 65 to the collector of the transistor 38. It will thus be seen that the transistors 39 and 62 will be simultaneously and periodically rendered conductive at a relatively low frequency determined by the setting of the variable resistance 36, for example 16 Hz to 67 Hz.

The output of the transistor 62 is used to control the operation of a push-pull type inverter 13*a* which includes a pair of transistors 81 and 82 whose emitters are connected to the negative voltage conductor 26 by the conductors 83 and 84. The collector of the transistor 81 is connected to ground by a conductor 86, the primary winding 87 of the transformer 88 and conductors 89 and 90. Similarly, the collector of the transistor 82 is connected to ground through the conductor 91, the primary winding 92 of the transformer 88 and the conductors 89 and 90. A capacitor 93 is connected across the emitter-collector circuits of the two transistors and a capacitor 94 is connected between the common connection of the two primary windings of the transformer and the negative voltage conductor 26.

The transistors 81 and 82 are biased periodically by the output of the transistor 62 of the inverter 13*a*, the common connection of the resistances 71 and 72 being connected to the electrical midpoint or center tap 95 of a secondary winding 96 of the transformer 88 whose opposite ends are connected to the bases of the transistors 81 and 82. It will be apparent that during each period of time the transistors 81 and 82 are rendered capable of being conductive by the output of the transistor 62, they will be made alternately conductive at a high frequency essentially determined by the tank circuit consisting of the capacitor 93 and the windings 87 and 92. The winding 96, of course, provides the feedback signals for sustaining oscillation.

A rectifier or diode network 100 is connected across the secondary winding 101 of the transformer 88 and includes a first pair of reversely connected diodes 102 and 013 connected in series across the secondary winding and a second set of reversely connected diodes 104 and 105 also connected in series across the secondary winding. A capacitor 108 is connected between the common connections of the two pairs of diodes and the common connection of the capacitor 108 and the first pair of diodes 102 and 103 is connected to the negative voltage conductor 26 by a conductor 110. The common connection of the diodes 104 and 105 is connected to one side of the winding 11 by conductors 111 and 112, the other side of the winding 11 being connected to the emitter of transistor 125 and to the ground connection 34.

It will now be apparent that each time the transistor 62 is rendered conductive, it biases the transistors 81 and 82 so that they also may be rendered conductive, and as they are caused to be alternately conductive at a high frequency during each period of time and the transistor 62 is conductive, the capacitor 108 is charged by the rectifier network 100 and a positive-going pulse is transmitted to the winding 11.

The output of the other multivibrator transistor 39 is used to control the operation of a transistor 115 of the pulse circuit 15, the common connection of the collector of the transistor 29 and the resistance 55 being connected to the base of the transistor 115 by the conductor 116, a diode 117 and the conductor 30. The transistor 115 is rendered conductive each time the transistor 39 is rendered nonconductive.

The emitter-collector circuit of the transistor 115 is connected across the negative voltage conductor 26 and ground by the conductor 25, the serially connected resistances 119 and 120 and the conductors 121 and 33.

The transistor 115 controls the operation of a second transistor 125 of the pulse circuit 15 whose base is connected to the common connection of the resistances 119 and 120, whose emitter is connected to the negative voltage conductor 26 by the conductors 127 and 25, and whose collector is connected to ground through the conductor 128, a resistance 129, the conductors 111 and 112, the winding 11 and the conductor 113.

Each time the transistor 125 is rendered conductive, which occurs when the transistors 81 and 82 cannot be rendered conductive because the transistor 62 is nonconductive, the winding 11 is connected to the negative voltage conductor 26 and the conductor 111 and a negative going pulse is applied across the winding. It will thus be apparent that square-wave voltages alternately positive and negative-going are applied across the winding 11 at a frequency determined by the frequency of oscillation of the multivibrator 13, e.g., between 16 and 67 Hz, as determined by the setting of the variable resistance 36.

The high frequency operation of the inverter 13*a*, e.g., 15 KHz, enables the components of the inverter, such as the transformer 88 and the rectifier network 14 to be of small size and still obtain the desired relatively high-amplitude, low-frequency signals for transmittal to the winding 11 which, of course, may be the ringer winding of a telephone set.

It will now be seen that a new and improved circuit 10 has been illustrated and described which provides low-frequency, square-wave signals for energizing an output circuit and operating a load device connected across the output circuit, each time a control signal is received at the terminal 18, renders the control transistor 12 conductive.

It will further be seen that the circuit is made to be of small and compact size by utilizing a high-frequency oscillator controlled by a gating means, such as the multivibrator 13, for periodically energizing a charging circuit, such as the diode network 14 which charges the capacitor 108 to provide positive-going pulses to the ringer winding and that a pulse circuit 15 also controlled by the multivibrator provides negative-going pulses to the ringer winding.

It will also be seen that the frequency of the output of the circuit may be varied, as for example, between 16 Hz and 67 Hz, by controlling the frequency of oscillation of the multivibrator 13.

It will further be seen that the circuit 10 may be used as pulse generator for operating any pulse-operable device, such as a ringer winding 11 of a telephone set and that it includes a high-frequency oscillator gated by a low-frequency oscillator, such as a multivibrator 13, and that the output of the oscillator is used to provide positive-going pulses.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A circuit for energizing an output circuit with low-frequency pulses, said circuit including: an input circuit of direct current; an oscillator for providing high-frequency alternating current connected across said input circuit; first means operatively associated with said oscillator and said output circuit and energized by said high-frequency alternating current for providing a positive-going pulse across said output circuit each time said oscillator is rendered operable; a pulse circuit connected across said input circuit and operatively associated with said output circuit for providing negative-going pulses across said input circuit; and second means connected across said input circuit and operatively associated with said oscillator and said pulse circuit for rendering said oscillator and said pulse circuit alternately operative at a frequency lower than the frequency of oscillation of said oscillator.

2. The circuit of claim 1, wherein said first means comprises a diode rectifier network energized by said oscillator and a capacitor chargable by said network.

3. The circuit of claim 2, wherein said second means comprises a multivibrator.

4. The circuit of claim 3, wherein said pulse circuit includes a first transistor having an emitter circuit connected across said input circuit in series with said output circuit and means operatively associated with said multivibrator and said first transistor for rendering said transistor conductive each time said oscillator is inoperative.

5. The circuit of claim 4, wherein said oscillator comprises a transformer having a pair of primary windings; a pair of transistors having emitter-collector circuits connected reversely in series across said primary windings; means connecting said primary windings and said emitters of said transistors to opposite sides of said input circuit; a capacitor connected across said windings for determining the frequency of oscillation of said oscillator; said transformer having a secondary feedback winding; and means operatively associated with said multivibrator and the bases of said oscillator transistors for periodically rendering said transistors operative.

6. The circuit of claim 5, wherein said transformer includes an output winding and wherein said diode network comprises a first pair of reversely connected diodes connected across said output winding and a second pair of reversely connected diodes connected across said output winding, a capacitor connected between the common connections of said pairs of diodes, and means connecting said capacitor in series with said output circuit across said input circuit.

7. The circuit of claim 6, and a ringer winding of a telephone set connected across said output circuit.

8. The circuit of claim 1, wherein said pulse circuit includes a first transistor having an emitter collector circuit connected across said input circuit in series with said output circuit and means operatively associated with said multivibrator and said first transistor for rendering said transistor conductive each time said oscillator is inoperative.

9. The circuit of claim 8, wherein said multivibrator includes first and second alternately conductive transistors, means operatively associated with said first multivibrator transistor and said oscillator for rendering said oscillator operative when said first multivibrator transistor is conductive; and means operatively associated with said second multivibrator transistor and said pulse circuit first transistor for rendering said pulse circuit conductive when said second multivibrator transistor is conductive.

* * * * *